United States Patent [19]

Umeda et al.

[11] Patent Number: 5,081,704
[45] Date of Patent: Jan. 14, 1992

[54] METHOD OF ARRANGING RADIO CONTROL CHANNELS IN MOBILE COMMUNICATIONS

[75] Inventors: Narumi Umeda; Onoe Seizo; Utano Takanori, all of Kanagawa, Japan

[73] Assignee: Nippon Telegraph & Telephone Corp., Tokyo, Japan

[21] Appl. No.: 584,977

[22] Filed: Sep. 19, 1990

[30] Foreign Application Priority Data

Sep. 19, 1990 [JP] Japan .................. 1-240823

[51] Int. Cl.$^5$ .............. H04Q 7/02; H04J 3/12
[52] U.S. Cl. ................... 455/33; 370/95.3; 455/34; 455/54; 455/56
[58] Field of Search ........ 455/33, 36, 53, 54, 455/56, 38; 370/50, 93, 95.1, 95.3, 110.1; 379/63, 59, 60

[56] References Cited

U.S. PATENT DOCUMENTS

| | | | |
|---|---|---|---|
| 4,551,852 | 11/1985 | Grauel et al. | 455/33 |
| 4,573,206 | 2/1986 | Grauel et al. | 455/33 |
| 4,633,509 | 12/1986 | Scheinert | 455/33 |
| 4,638,479 | 1/1987 | Alexis | 370/95 |
| 4,754,453 | 6/1988 | Eizenhöfer | 370/95 |
| 4,850,033 | 7/1989 | Eizenhöfer et al. | 455/56 |

FOREIGN PATENT DOCUMENTS 55-50427 12/1980 Japan .

Primary Examiner—Curtis Kuntz
Assistant Examiner—Chi H. Pham
Attorney, Agent, or Firm—Townsend & Townsend

[57] ABSTRACT

According to a method of arranging radio control channels in mobile communications, for covering a service area with a plurality of radio zones and causing base and mobile stations to exchange signals through the control channels, a broadcasting information transmission portion is assigned to the control channels. This broadcasting information is to be transmitted from the base station to each mobile station to broadcast information associated with radio zones. Information associated with control channel structure in units of base stations is broadcast to the broadcasting information transmission portion. A frequency and a time slot capable of causing the base station and the each mobile station to exchange the signals are determined on the basis of the pieces of broadcasting information and an identical number commonly recognized by the base and mobile stations.

5 Claims, 9 Drawing Sheets

RADIO CONTROL
CHANNEL
No.

P1∼P12: PCH GROUP SLOT POSITION
$N_f = 4$
$N_p = 12$

P1~P12: PCH GROUP SLOT POSITION
$N_f = 4$
$N_p = 12$

| | BCCH | PCH | CCCH |
|---|---|---|---|
| RADIO CONTROL CHANNEL ① | 2 | 5 SLOTS | 23 SLOTS |
| RADIO CONTROL CHANNEL ② | 2 | 5 SLOTS | 23 SLOTS |
| RADIO CONTROL CHANNEL ③ | 2 | 4 SLOTS | 24 SLOTS |
| RADIO CONTROL CHANNEL ④ | 2 | 4 SLOTS | 24 SLOTS |

|  | BCCH | PCH | CCCH |
|---|---|---|---|
| RADIO CONTROL CHANNEL ① | 2 | 9 SLOTS | 19 SLOTS |
| RADIO CONTROL CHANNEL ② | 2 | 9 SLOTS | 19 SLOTS |

FIG. 3C

|  | BCCH | PCH | CCCH |
|---|---|---|---|
| RADIO CONTROL CHANNEL ① | 2 | 18 SLOTS | 10 SLOTS |

FIG. 3D

| RADIO CONTROL CHANNEL ① | PCH 30 SLOTS |
|---|---|
| RADIO CONTROL CHANNEL ② | ACH 30 SLOTS |
| RADIO CONTROL CHANNEL ③ | ACH 30 SLOTS |
| RADIO CONTROL CHANNEL ④ | ACH 30 SLOTS |

FIG. 4A
PRIOR ART

| RADIO CONTROL CHANNEL ① | PCH 30 SLOTS |
|---|---|
| RADIO CONTROL CHANNEL ② | ACH 30 SLOTS |
| RADIO CONTROL CHANNEL ③ | ACH 30 SLOTS |

FIG. 4B
PRIOR ART

| RADIO CONTROL CHANNEL ① | PCH 30 SLOTS |
|---|---|
| RADIO CONTROL CHANNEL ② | ACH 30 SLOTS |

FIG. 4C
PRIOR ART

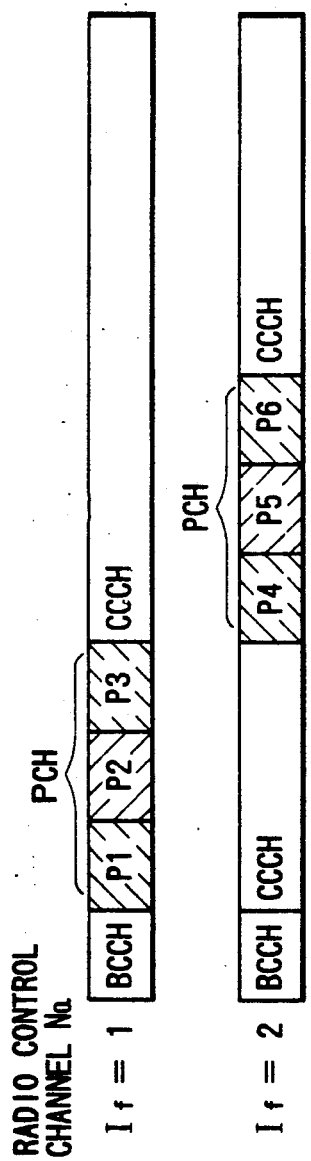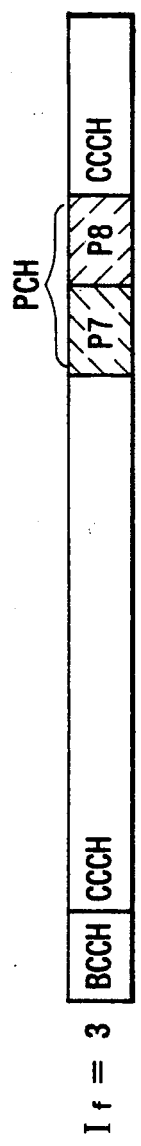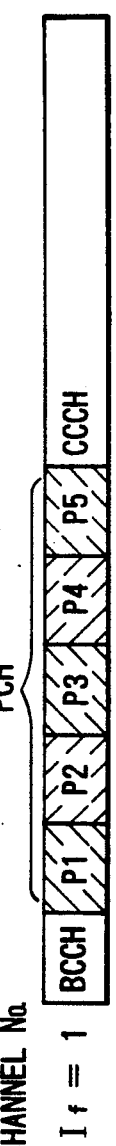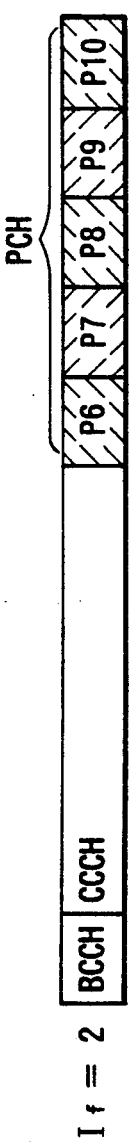
FIG.5
FIG.6

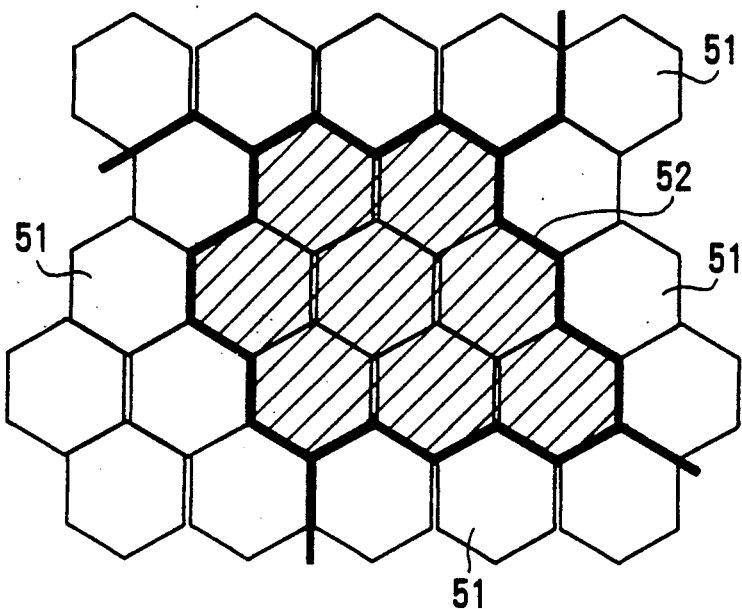
F I G.7
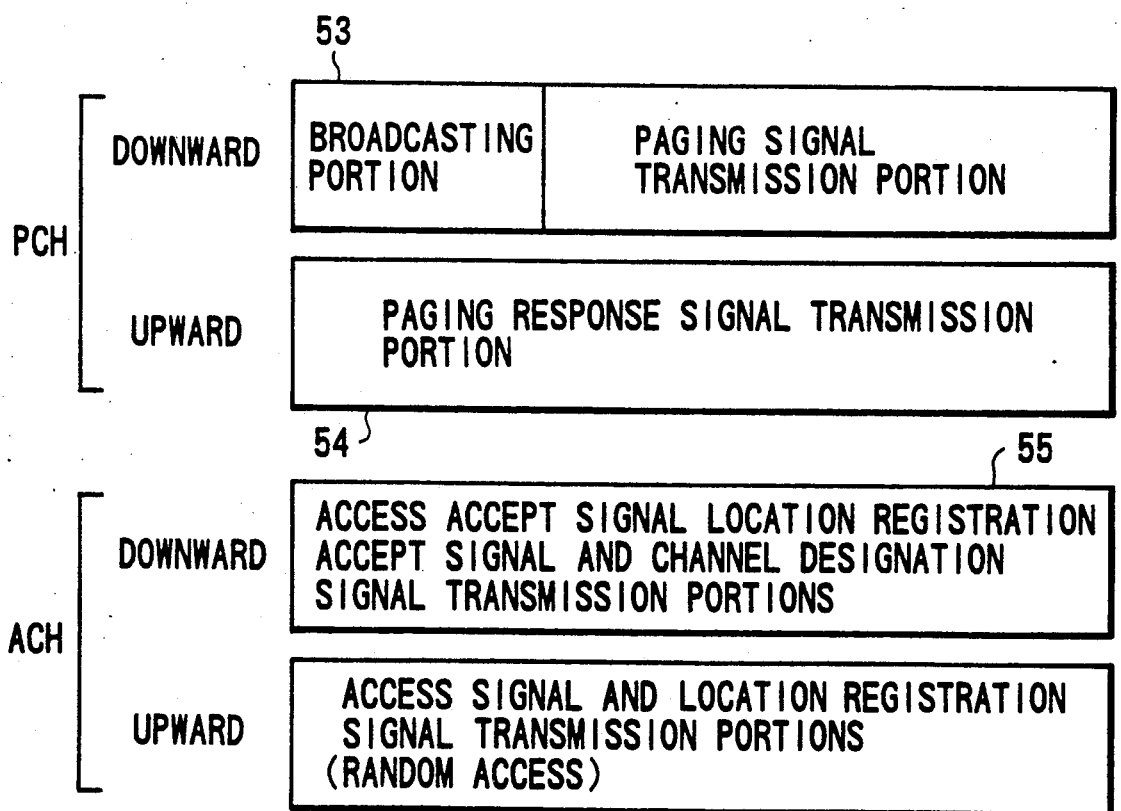
F I G.8

$f_1$ : CONTROL CH FREQUENCY OF ZONE 1
$f_2 \sim f_4$ : FREQUENCIES OF OTHER ZONES

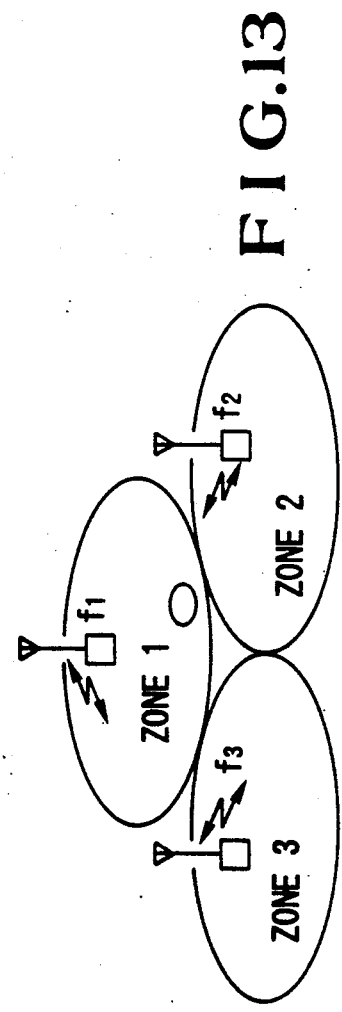
FIG. 13
FIG. 14

METHOD OF ARRANGING RADIO CONTROL CHANNELS IN MOBILE COMMUNICATIONS

BACKGROUND OF THE INVENTION

The present invention relates to a method of arranging control channels for exchanging control signals between a base station and a mobile station in mobile communications.

Control channels shared by a plurality of mobile stations in a conventional mobile communication system are mainly classified into paging and access control channels. In a mobile station access mode, a mobile station paging mode, or a mobile station location registration mode, control signals are transmitted between a base station and a mobile station through these control channels. In a conventional system, the paging and access control channels are arranged as independent channels.

The term "radio control channel" in this specification represents a physical radio control channel. For example, this channel is defined as a radio channel having a given frequency in FDMA, or as a radio channel constituted by a frequency and time slots in TDMA. The term "control channels" include functionally classified paging and access control channels in a broad sense.

The radio zone configuration as an assumption of a control channel arrangement will be described below.

FIG. 7 is a view for explaining a radio zone configuration and a paging area.

One radio zone 51 (a hexagonal portion in FIG. 7) is formed to have one base station as its center. A paging area 52 (a portion surrounded by a thick line in FIG. 7) is formed to perform location registration and paging of a plurality of radio zones 51. Control channels are arranged under the zone configuration, as will be described with reference to FIG. 8.

A P channel (paging channel or PCH) is a paging control channel which is commonly used within the location registration area and the paging area. A downward P channel 53 serves as a control channel for commonly transmitting paging information to mobile stations in radio zones within the paging area.

Common information of radio zones, and the like are also broadcast through the downward P channel 53. On the downward P channel, transmitting timings of the base stations in the same paging area are synchronized each other with a given frequency, and the base stations transmit the same signals simultaneously to mobile stations within the paging area.

An upward P channel 54 serves as a channel for transmitting to the base station a paging response signal in response to an paging signal to a mobile station. The upward P channel 54 controls a transmission timing of the mobile station so as to prevent signal collision on the basis of control from the base station and transmits the paging response signal. The P channel is called a broad control channel in a sense that the same information is transmitted to the plurality of radio zones.

An A channel (access channel or ACH) is a access control channel used for causing a mobile station to transmit information. The A channels are independent of each other in units of radio zones. An upward A channel 56 is a random access channel. The mobile station transmits an access signal to the base station, and the base station transmits response signals to the mobile station through corresponding downward A channels 55. The A channel also transmits a location registration signal, a communication channel designation signal required to establish a communication channel. The A channel is called a narrow control channel in a sense that different pieces of information are transmitted in units of radio zones.

In mobile communications, a so-called traffic taper in which traffic densities are different in units of radio zones typically occurs in an urban area. Therefore, it is important to arrange control channels under the above circumstances.

A conventional control channel arrangement is shown in FIGS. 9(a) to 9(c). FIG. 9(a) is a view showing a relationship between radio zones and a traffic taper, FIG. 9(b) is a view showing a control channel arrangement in a radio zone having a higher traffic density, and FIG. 9(c) is a view showing a control channel arrangement in a radio zone having a lower traffic density.

The number of P channels respectively assigned to the radio zones is determined in accordance with the number of subscribers in the entire paging area. The P channels are equally arranged in all the radio zones.

Since simultaneous transmitting by plural base stations is performed, the P channels must have identical control channel structures in all the radio zones (PCH ① and PCH ② in FIGS. 9(b) and 9(c)).

The required number of ACHs is determined in accordance with the number of subscribers in each radio zone. That is, the ACHs are proportionally assigned to the radio zones in accordance with the numbers of subscribers in the radio zones.

More specifically, three A channels (ACH ①, ACH ② and ACH ③) are used in a radio zone 51a having a high traffic density, while one one A channel (ACH ①) is used in a radio zone 51b having a low traffic density.

In a conventional system, since a paging response signal which is returned from one radio zone within a paging area is transmitted through the P channel serving as a broad channel, the upward P channel is not used during transmission of the response signal in the radio zones having no mobile stations which respond to the paging. As a result, efficiency of use of the upward P channel is degraded, resulting in inconvenience.

Assume that a traffic taper is present. Since simultaneous transmitting is performed within a paging area, the same number of P channels as that in a radio zone having a high traffic density must be arranged in a radio zone having a low traffic density. The traffic zone having a low traffic density has poor efficiency of use of the upward P channel as compared with the radio zone having a high traffic density, thus further degrading efficiency as a whole. At least one P channel and at least one A channel must be arranged in each radio zone. Efficient utilization of frequency resources cannot be achieved, and thus the number of control transmitters/receivers is increased.

Since the P and A channels are physically independent radio channels, channel switching is required to change the P channel to the A channel, and vice versa, thus requiring complicated control.

When the P and A channel numbers are to be changed in accordance with a change in zone arrangement, the numbers of control transmitters/receivers in the base stations, must be increased/decreased, respectively.

In a system such as an AMPS system wherein simultaneous transmission of plural radio zones is performed using different radio control channel frequencies in units of radio zones in the paging area, in a period such as an initial period during which a traffic density is low, or in an area having a low traffic density in a rural area, an A-channel signal can also be transferred through a P-channel radio control channel.

However, when the number of required radio control channels is two or more, other independent A channels are arranged.

In general, the P channel is used to transfer information (paging) to all mobile stations in a broad paging area, and efficiency per zone is as low as 1/(zone number in the paging area). The upward A channel is a random access channel, and its efficiency is generally low, i.e., a maximum of about 10%. The independent channels ar arranged due to independent upward and downward channels having poor efficiency. Therefore, utilization efficiency of frequency resources and transmitters/receivers is poor.

SUMMARY OF THE INVENTION

It is an object of the present invention to provide a method of arranging control channels in mobile communications, capable of efficiently transmitting control signals even if a traffic taper is present.

It is another object of the present invention to provide a method of arranging control channels in mobile communication, having high versatility for extension capable of easily changing an arrangement into an optimal arrangement when a system is to be extended.

In order to achieve the above objects according to the first aspect of the present invention, there is provided a method of arranging control channels in mobile communications in a mobile communication system for covering a service area with a plurality of radio zones and exchanging signals between a base station and a mobile station by using the control channels, comprising the steps of assigning to the control channels a broadcasting information transmitting portion for broadcasting information associated with a radio zone from the base station to the mobile station, of broadcasting information associated with a control channel structure identical or different in units of base stations, and of determining a frequency and time slots for exchanging signals between the base station and the mobile station by using the information associated with the control channel structure and a number commonly recognized by the base station and the mobile station.

According to the second aspect of the present invention, in the method of arranging control channels in mobile communications in the first aspect, a paging signal transmission portion grouped to be received by a given mobile station is determined by this given mobile station, and the base station has a function of transmitting a paging signal to only the paging signal transmitting portion grouped to be received by the given mobile station. In a waiting mode, the given mobile station receives only the paging portion grouped for the given mobile station.

According to the third aspect of the present invention, in the method of arranging control channels in mobile communications in the second aspect, the given mobile station has a function of receiving other control channels by portions other than the paging signal transmission portion grouped to be received by the given mobile station. In the waiting mode, the given mobile station monitors radio channels of other radio zones by the portions other than the paging signal transmission portion grouped to be received by the given mobile station.

The method according to the first aspect of the present invention employs a paging/access (PA) integration arrangement of radio control channels. The number commonly recognized by the base and mobile stations and the content of the broadcasting information of each base station are subjected to predetermined processing, thereby determining a frequency and time slots for allowing the base and mobile stations to exchange signals.

Unlike the conventional method, the PA integration channel arrangement is employed even if a plurality of radio control channels are used within the radio zone. In addition, the number commonly recognized by the base and mobile stations and the content of the broadcasting information of each base station are subjected to the predetermined processing to determine the frequency and time slots for allowing the base and mobile stations to exchange signals.

The second aspect of the present invention is an application of the first aspect thereof. Of all PCHs grouped to be received by the given mobile station, the given mobile station receives only a designated paging slot. The second aspect exemplifies an application for an intermittent reception system. In addition, the third aspect of the present invention is an application of the second aspect thereof. Although the given mobile station must always receive its own PCH slot in the paging waiting mode. Other portions can be received if they are required. For example, the given mobile station can monitor radio channels of other radio zones during a time interval except for reception of its own PCH.

BRIEF DESCRIPTION OF THE DRAWINGS

FIGS. 3A to 3D are views showing control channel arrangements in the presence of a traffic taper according to the first embodiment of the present invention;

FIGS. 4A to 4C are views showing conventional control channel arrangements in the presence of a traffic taper so as to compare them with those of the present invention;

FIG. 5 is a view showing a channel arrangement (four radio control channels in one radio zone) in which positions of paging slots are identical in all radio zones in a call area;

FIG. 6 is a view showing a channel arrangement (two radio control channels in one radio zone) in which positions of paging slots are identical in all radio zones in a call area;

FIG. 7 is a view for explaining a radio zone arrangement and a call area;

FIG. 8 is a view showing a conventional control channel arrangement;

FIGS. 13 and 14 are views showing an operation for causing a mobile station in a waiting mode with a frequency $f_1$ to receive BCCHs of zones 2 and 3.

DESCRIPTION OF THE PREFERRED EMBODIMENTS

Preferred embodiments of the present invention will be described with reference to the accompanying drawings.

First Embodiment

Figure 1:
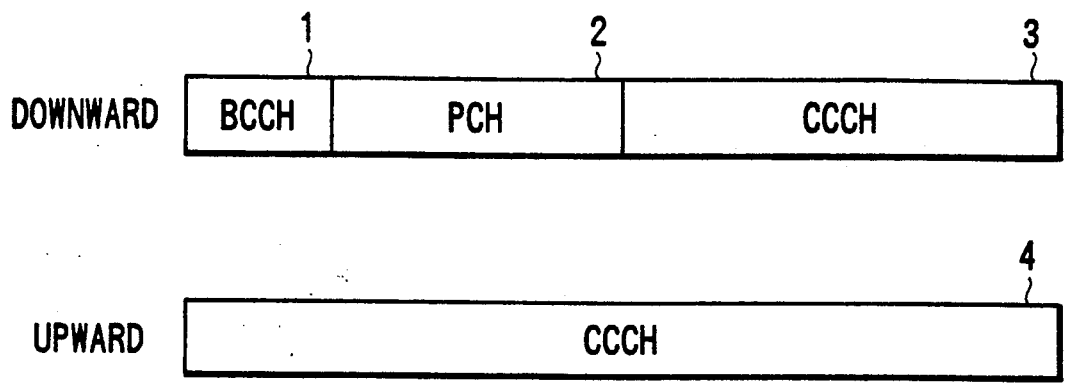
FIG. 1 is a view showing a basic control channel arrangement according to the present invention.

FIG. 1 shows a basic control channel structure according to the present invention.

Reference numeral 1 denotes a broadcasting control channel (BCCH) which is present only in the downward channel. The broadcasting control channel 1 broadcasts information for different control channel structures in units of base stations (a control channel code in each zone, a control channel number, a mobile station grouping number, information associated with determination of waiting channel, and regulating information), base station status information, paging area information, and the like to the mobile station. Reference numeral 2 denotes a paging channel (PCH) which is present as only the downward channel and performs paging of a mobile station. Reference numerals 3 and 4 denote common control channels (CCCH) whose upward side is a random access channel for transmitting an access signal, a paging response signal, a location registration signal, and the like, and whose downward side transmits an access accept signal, a paging response accept signal, a channel designation signal, and the like.

Reference symbols BCCH and PCH denote broad control channels; and CCCH, a narrow control channel. If a required number of radio control channels is two or more, these channels are constituted as a PA integration arrangement, thereby maximally enhancing the feature of the PA integration channels obtained by integrating independent upward and downward channels having poor efficiency.

On the basis of the basic control channel arrangement, the following pieces of information associated with the control channel structure broadcast by the channel BCCH are given:

$N_f$: the number of radio control channels in a given radio zone $N_p$: the number of PCH groups in a given paging area By using these pieces of broadcasting information and a mobile station identifier $I_m$ (mobile station unique number) commonly assigned to the higher-level stations and the mobile stations, the control structure of the base and mobile stations is determined. Note that the group number $N_p$ may be set to be different in units of radio zones in place of setup in units of paging areas. The mobile stations are grouped to perform intermittent paging, thereby achieving battery savings.

Figure 2:
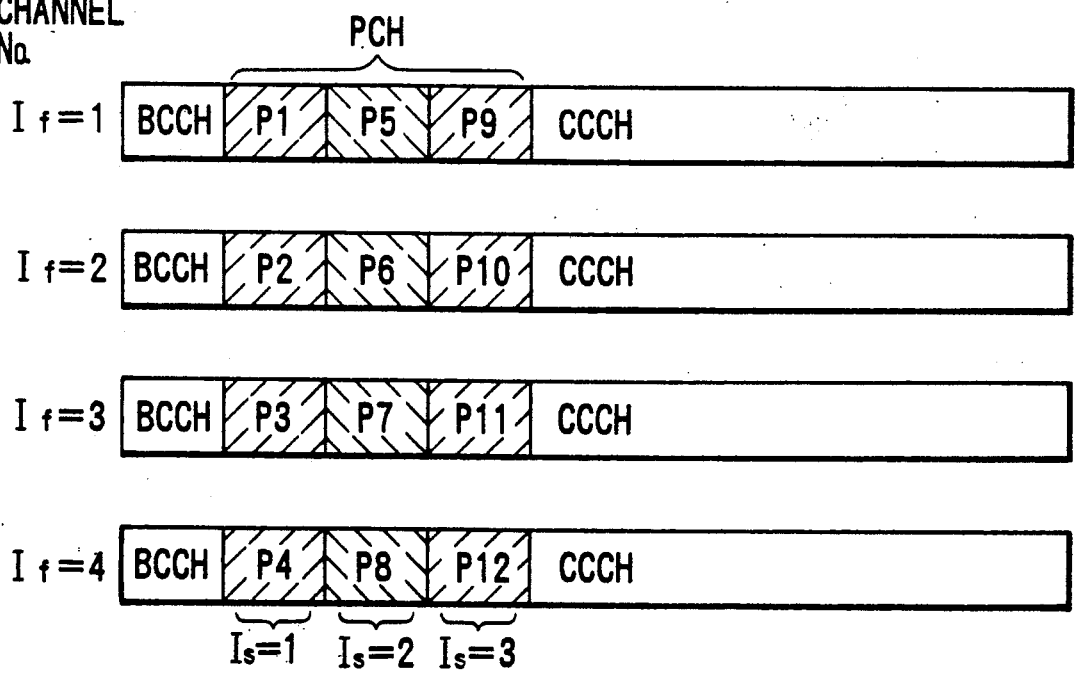
FIG. 2 is a view showing a control channel structure to be described in the first embodiment.

A control channel arrangement determined by the broadcasting information is shown in FIG. 2. This arrangement illustrates only a downward side.

Each upward channel consists of a random access CCCH channel. FIG. 2 shows a case in which the number of radio control channels is four and the number of PCH groups is 12, that is, $N_f=4$ and $N_p=12$.

In this control channel arrangement, procedures and operations for determining which radio control channels are used by the mobile station to perform information exchange will be described below. In this case, the start of the PCH in each radio control channel (the start represents the position of the first P channel slot in each of radio channel $I_f=1$ to 4, i.e., each of P1, P2, P3, and P4 in FIG. 2) is detected by a frame sync signal or the like. A BCCH-PCH-CCCH arrangement is a superframe arrangement and is repeated at a predetermined period. The start of the BCCH channel is determined by changing a frame sync signal pattern to that of another channel slot. The number of BCCH slots is broadcast by the BCCH. The position of the PCH is determined by these pieces of information.

A mobile station receives a BCCH channel and detects the number $N_f$ of radio control channels in this radio zone and the number $N_p$ of PCH groups of this radio zone.

The mobile station calculates the following to detect its own paging PCH group No.:

$$(I_m - 1) \bmod N_p + 1 = I_p \ldots \quad (1)$$

where $I_p$ is the mobile station group No. (received PCH group No.) The mobile station then calculates the following to detect a radio control channel No. $I_f$ in which a CCCH channel to be received is present:

$$(I_p - 1) \bmod N_f + 1 = I_f \ldots \quad (2)$$

where $I_f$ is the radio control channel No. to be received by the mobile station.

The radio control channel Nos. $I_f$ are consecutive numbers starting from one to $N_f$.

A frequency actually received is broadcast by the BCCH channel in correspondence with each of $I_f = 1, \ldots, N_f$, and the mobile station already knows the frequency. The mobile station then detects a slot position $I_s$ to be received by the mobile station:

$$[I_p/N_f] + 1 = I_s \ldots \quad (3)$$

This slot position represents a number when the leftmost PCH slot position of each radio channel is defined as "1". Referring to FIG. 2, reference symbols $P_1$ to $P_4$ denote slot positions for $I_s=1$, i.e., slot 1; $P_5$ to $P_8$, slot positions for slot 2; and $P_9$ to $P_{12}$, slot positions for slot 3.

A mod B is a remainder obtained by dividing A by B, and [A] represents a maximum integer which does not exceed A.

The above calculations are also performed in the base station to select and specify a frequency and a time slot, both of which are capable of exchanging control signals with the mobile station.

An example for $I_m=5394$, $N_f=4$, and $N_p=12$ will be described.

$$\begin{aligned} I_p &= (I_m - 1) \bmod N_p + 1 \\ &= (5394 - 1) \bmod 12 + 1 = 6 \end{aligned} \quad (1')$$

$$\begin{aligned} I_f &= (I_p - 1) \bmod N_f + 1 \\ &= (6 - 1) \bmod 4 + 1 = 2 \end{aligned} \quad (2')$$

$$\begin{aligned} I_s &= [I_p/N_f] + 1 \\ &= [6/4] + 1 = 2 \end{aligned} \quad (1')$$

The PCH has $I_p=6$ (sixth group).

The paged mobile station receives the $I_s=2$ (second slot) of $I_f=2$ (second the radio control channel). That is, the paged mobile station receives the slot position P6 in FIG. 2. The paged station receives the CCCH of the radio control channel No $I_f=2$ (second radio control channel).

A channel arrangement in the presence of a traffic taper in radio zones within a paging area will be described below with reference to FIG. 3. Reference symbols 10a to 10c denote radio zones; 11, a paging area.

Since upward channels consist of CCCHs, only downward channels are illustrated.

The capacities of the PCHs in all the radio zones 10a to 10c within the area are equal to each other. The required time slot number of the CCCHs are determined in accordance with the capacities of the respective radio zones. Each channel has 30 time slots per unit time. The BCCH has two slots. The PCH has one slot per traffic unit (a traffic given when a given subscriber capacity is defined as a measuring unit) as far as paging is concerned. The CCCH requires about 9 slots per traffic unit.

Figures 3A, 3B:
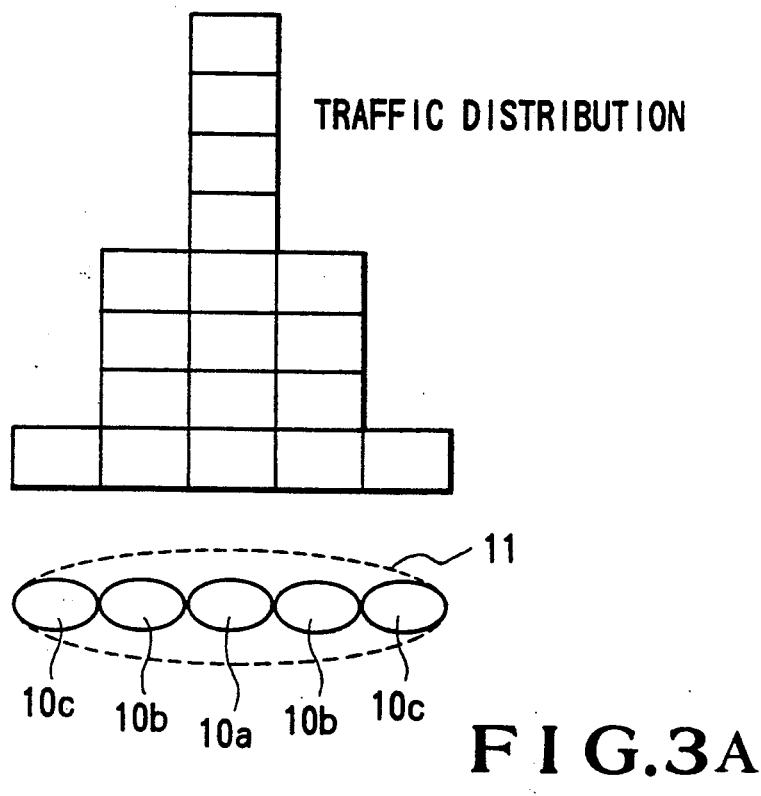
Figure 9A:
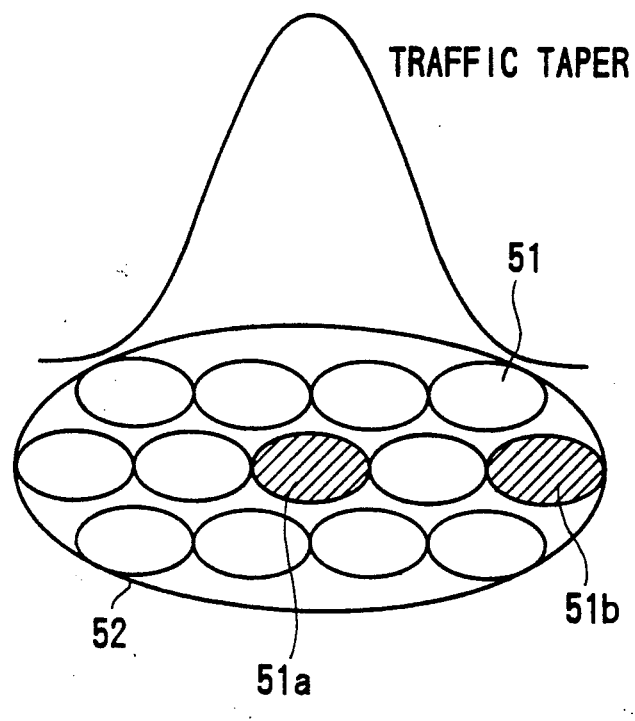
FIGS. 9(a) to 9(c) are views showing conventional control channel arrangements in the presence of a traffic taper.
Figure 9B:
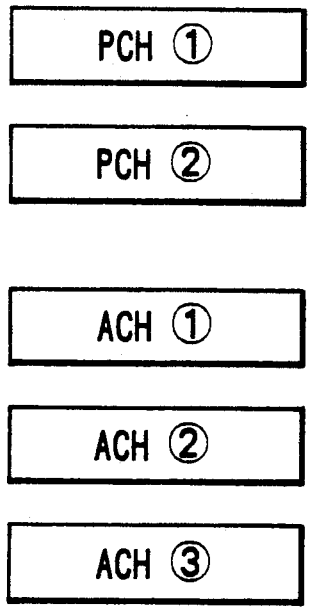
Figure 9C:
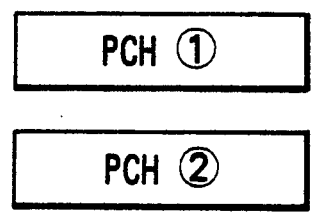

Referring to FIG. 3A, paging of, e.g., 18 traffic units must be performed in the paging area as a whole. The PCH requires 18 slots per zone. The PCH of 18 slots must be assured in each of the radio control channels 10a, 10b, and 10c.

Under the above assumption, the radio zone 10a requires 8 traffic units, and the CCCH must have 72 (=8×9) slots within the zone. In order to assure the PCH of 18 slots and the CCCH of 72 slots, four control channels are required.

The radio zone 10b requires four traffic units, and the CCCH must have 36 (=4×9) slots. In order to assure the PCH of 18 slots and the CCCH of 36 slots, two control channels are required.

The radio zone 10c requires one traffic unit, and the CCCH has 9 (1×9) slots. In order to assure the PCH of 18 slots and the CCCH of 9 slots, one control channel is required.

As shown in FIG. 3B, the radio zone 10a having a higher traffic density requires four radio control channels. As shown in FIG. 3C, however, the radio zone 10b requires two channels. As shown in FIG. 3D, the radio zone 10c having the lowest traffic density requires one channel.

Channel arrangements according to the conventional method are illustrated in FIGS. 4A to 4C in correspondence with FIGS. 3B, 3C, and 3D.

As shown in FIG. 4A, a radio zone 10a having a high traffic density requires four channels as in FIG. 3B. However, a radio zone 10b requires three channels larger than that of FIG. 3C by one, as shown in FIG. 4B.

As shown in FIG. 4C, a radio zone 10c having the lowest traffic density requires two channels larger than that of FIG. 3D by one. That is, the method of the present invention requires a total of 10 channels in five radio zones, while the conventional method requires a total of 14 channels. A total number of transmitters/receivers can be reduced by about 30% from the conventional method.

According to the first embodiment, the PCH for paging the mobile station in the waiting mode has the same frequency as that of the CCCH for exchanging signals in establishment of communication channels in the paging and access modes. When the PCH is switched to the CCCH, and vice versa, control can be simpler than the conventional method which requires such a frequency change, thereby improving system reliability.

When a control channel arrangement is to be changed as in a system extension, only information associated with the control channel structure for performing broadcasting by means of the BCCH is changed to easily change the control channel arrangement.

Second Embodiment

The second embodiment exemplifies a method of maintaining positions of PCH slots received by a mobile station even if radio zones are shifted will be described below.

Pieces of broadcasting information are defined as follows:

$N_f$: the number of radio control channels within a given radio zone $N_p$: the number of PCH groups in a given paging area.

These pieces of broadcasting information and a mobile station identifier $I_m$ (mobile station unique No.) common to the higher-level stations and the mobile stations are used.

The mobile station receives the BCCH and can detect the numbers $N_f$ and $N_p$ of the given radio zone. The mobile station calculates the following and detects its own PCH group No. to be received:

$$(I_m - 1) \bmod N_p + 1 = I_p \ldots \quad (1)$$

where $I_p$ is the mobile station group No. (received PCH group No.) The mobile station then calculates the number of PCH groups on each radio control channel as follows:

$$N_p \text{ div } N_f = \alpha \ldots \quad (2)$$

$$N_p \bmod N_f = \beta$$

Number of PCH Groups: $N_i = \alpha + 1 \ (i \leq \beta)$ $\alpha \ (\beta < i)$ By this calculation, the number $N_i$ ($i=1, 2, \ldots$) of PCH groups on the ith radio control channel is obtained. Note that A div B represents a quotient obtained by dividing A by B.

By using the mobile station group No. $I_p$, the mobile station obtains radio control channel No. to be received:

$$I_f = k + 1 \ldots \quad (3)$$

for a maximum k satisfying $$\sum_{i=0}^{k} N_i < I_p$$

where $N_0 = 0$

The mobile station obtains a channel number $I_f$ of a channel in which the PCH and CCCH to be received are present. In the above relation, k represents the number of radio control channels having smaller numbers than the radio control channel $I_f$ which contains $I_p$ to be received by this mobile station.

The channel Nos. $I_f$ are consecutive numbers starting from radio control channel 1 in each radio zone to channel $N_f$. A frequency to be actually received is broadcast in correspondence with $I_f = 1, \ldots, N_f$ and already known to the mobile station.

A slot position $I_s$ to be received by the mobile station is obtained as follows:

$$I_p = I_s \ldots \quad (4)$$

The slot position represents the number obtained when the first PCH slot position for the radio control channel No. $I_f=1$ is given.

The above operation is also performed in the base station to select and specify a frequency and a time slot which allow control signal exchange between the base and mobile stations.

A case for $I_m=5394$, $N_f=4$, and $N_p=10$ will be exemplified. In this case, the corresponding control channel arrangement is shown in FIG. 5, although only the downward channel is illustrated since all upward channels consist of only CCCHs.

$$I_p = (I_m - 1) \bmod N_p + 1 \quad (1')$$
$$= (5394 - 1) \bmod 10 + 1 = 4$$

$$N_p \text{ div } N_f = 10 \text{ div } 4 = 2(=\alpha) \quad (2')$$

$$N_p \bmod N_f = 10 \bmod 4 = 2(=\beta)$$

PCH group Nos.:
$$N_1 = \alpha + 1 = 3 \ (1 \leq \beta)$$

$$N_2 = \alpha + 1 = 3 \ (2 \leq \alpha)$$

$$N_3 = \alpha = 2 \ (\beta < 3)$$

$$N_4 = \alpha = 2 \ (\beta < 4)$$

$$I_f = k + 1 = 2 \quad (3')$$

$$\sum_{i=0}^{1} N_i = 3 < (I_p = 4) < \sum_{i=0}^{2} N_i = 6$$

$k$ satisfying the above inequality is 1
$$I_s = I_p = 4 \quad (4')$$

The PCH has $I_p=4$ (fourth group).

The paged mobile station receives $I_s=4$ (fourth slot), i.e., $P_4$ of $I_f=2$ (second radio control The mobile station receives the CCCH of $I_f=$ second radio control channel.

Similarly, a case for $I_m=5394$, $N_f=2$, and $N_p=10$ will be calculated. This case indicates that a mobile station is moved to a 2-radio control channel radio zone. The corresponding control channel arrangement is shown in FIG. 6, and only the downward channel is exemplified. All the upward channels consist of CCCHs.

The calculation results are as follows:
$I_p=4$
$N_1=5$
$N_2=5$
$I_f=1$
$I_s=4$

Therefore, the PCH has $I_p=4$ (fourth group). A paged mobile station receives $I_s=4$ (fourth slot), i.e., $P_4$ (FIG. 6) of $I_f=1$ (first radio control channel).

The mobile station receives the CCCH of $I_f=1$ (first radio control channel). Since the values $I_s$ are equal to each other ($I_s=4$ in FIGS. 5 and 6), the PCH slot to be received is kept unchanged even if the zone is changed.

In the method of the second embodiment, the paging timings for each mobile station are equal in all the radio zones of a given paging area. The method of this embodiment eliminates the following incomplete transmission of the paging signal. When a given mobile station is paged while moving from one radio zone to another radio zone, the given mobile station cannot receive paging information because the paging signal is not transmitted from the base station in a movement start zone. At the same time, the given station cannot receive this paging information in the movement end zone because the paging signal is already transmitted. Therefore, the method of this embodiment can improve paging reliability.

According to the method in the first and second embodiments, broadcasting information and signals commonly recognized by the base and mobile stations are used to perform predetermined operations to designate a control channel structure, thereby determining a frequency and time slots for exchanging signals between the base and mobile stations.

The above embodiments exemplify two calculation methods. However, any method may be employed if the radio control channels capable of exchanging control signals between the base and mobile stations and the time slots are uniquely determined.

PCH slots are continuously present on one radio control channel. However, a CCCH slot may be interposed between PCH slots to add or modify broadcasting parameters.

Radio channels can be designated in a TDMA scheme by designating a frequency to be used and slots to be used.

Figure 10:
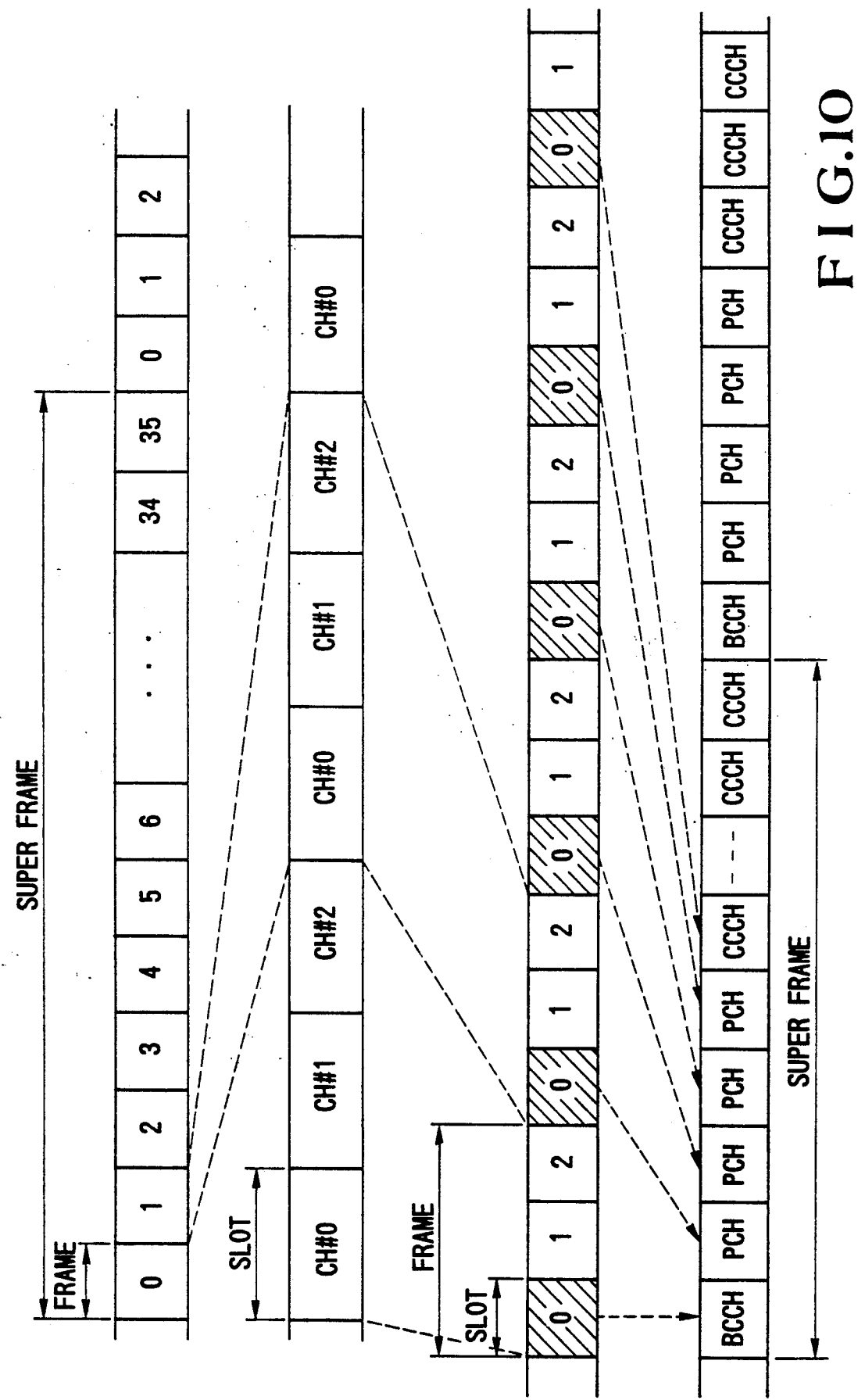
FIG. 10 is a view showing a control channel arrangement in TDMA.

One TDMA frame of three slots has a period of 20 ms, 36 TDMA frames constitute one superframe, and control channels BCCH, PCH, and CCCH are repeated, as shown in FIG. 10. In this case, one superframe is used as a unit. The radio control channel is assigned to slot 0, and slots 1 and 2 are used for communication.

Of the superframes, a synchronization word of the slot of the 0th TDMA frame is different from these of other TDMA frames, so that the start of the superframe can be recognized. The channel structure is determined on the basis of the start of the superframe. In this case, a given mobile station must receive its own PCH slots in the waiting mode and can receive other portions as needed. A frequency can be changed during an interval except for the PCH reception duration, the reception levels of other radio zones and sector output signals may be measured, and a reception level of frequencies designated by the base station can be measured.

Figure 11:
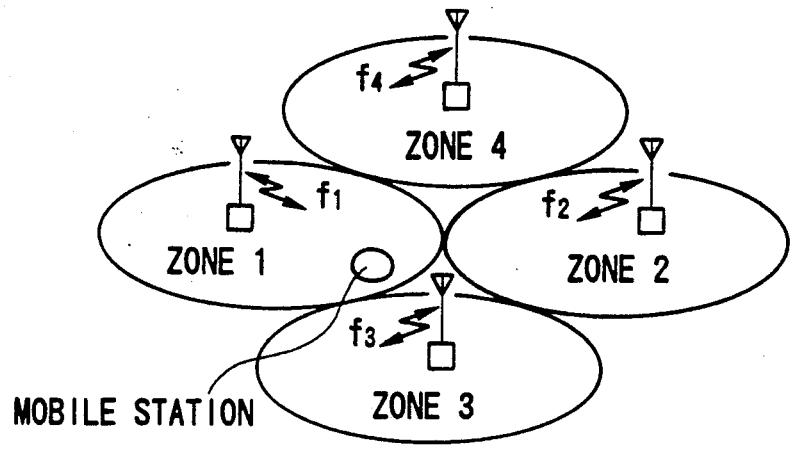
FIGS. 11 and 12 are views showing a relationship between mobile stations and paging frequencies.
Figure 12:
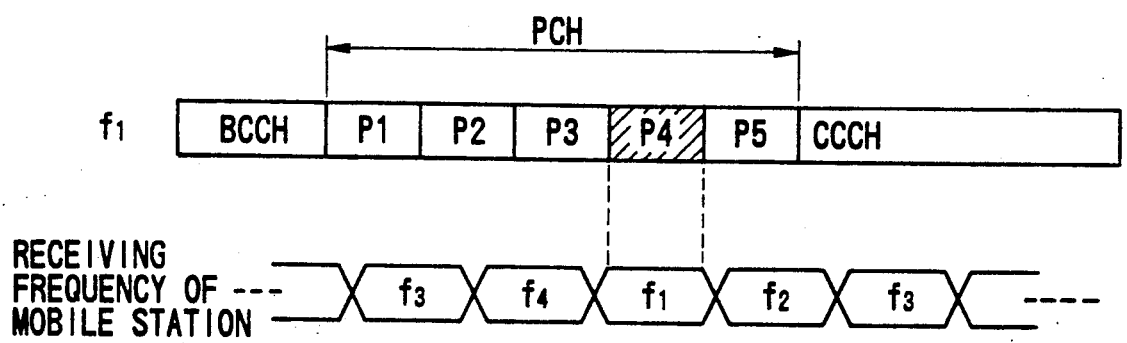

FIGS. 11 and 12 show this example. A PCH group number is given as 5, which is used as an object to be moved with respect to the PCH group No. 4.

Since the given mobile station receives only its own PCH group, the frequency of the given mobile station is changed to another frequency during an interval except for the PCH reception duration, thereby measuring its reception level.

Assume that the given mobile station is located in a zone 1 in FIG. 11, and zones 2 to 4 are located around the zone 1, and signal exchange is performed in these zones 2 to 4 at frequencies $f_2$ to $f_4$.

FIG. 12 shows a relationship between the receiving frequency and slots of the given mobile station. The given station receives the frequency $f_1$ during the $P_4$ slot as its own PCH slot. In other slots, the given mobile station receives the frequencies $f_2$ to $f_4$ of the neighboring zones and measures reception levels. With these operations, the zone in the waiting mode can be determined without impairing paging.

In a plurality of zones or sectors obtained by dividing each zone into smaller areas, the frequency of the given mobile station is changed to a frequency comparing reception levels and hence detecting a radio-zone or sector having a maximum level.

In the mobile station, the frequency may be changed to a frequency used to measure interference and measure reception levels. The mobile station calculates a ratio of the calculated reception level with the currently used level to obtain a ratio of a desired wave to an interference wave to facilitate selection of a communication channel.

If a time interval is provided between the BCCH and PCH slots to change a frequency of a receiver/transmitter of a mobile station and allow signal exchange, the mobile station which receives any PCH slot can change the frequency before and after the BCCH slots to receive the broadcasting information of other radio zones or sectors. Therefore, reliability of zone or sector determination can be improved. More specifically, a slot (CCCH slot in this case) which need not be received in the waiting mode is assigned before and after the BCCH slots of each radio control channel. The frequency change time can be absorbed, and the mobile station can receives BCCH slots of other zones without impairing reception of its own PCH slots if reception levels of other zones are sufficiently high.

FIGS. 13 and 14 show a mobile station operation for receiving BCCH slots of zones 2 and 3 when this mobile station is located in a zone 1 in the waiting mode at a frequency $f_1$. The mobile station receives the BCCH slot, and the frequency $f_1$ is changed to a frequency $f_2$ at the end of the BCCH slot, thereby receiving a BCCH slot of the zone 2. In this case, the mobile station simultaneously measures a reception level at the frequency $f_2$. The frequency of the mobile station is returned to the frequency $f_1$ so as to cause it to receive its own PCH slot. Since the frequency change time is long, it is absorbed by the CCCH slot which does not receive it. After the mobile station receives its own PCH slot, the frequency is changed to the $f_3$ at the start of the next BCCH slot. The mobile station then receives the BCCH slot of the zone 3 and at the same time measures the reception level at the frequency $f_3$.

In this manner, by receiving the BCCH slots of other zones, the mobile station can receive base station Even if the reception level is temporarily increased due to over reach or the like, its content is detected, and accurate zone determination based on not only reception levels but also other factors can be performed.

In the embodiments described above, all frequencies are assigned to one radio control channel as in FDMA to arrange the control channels. However, as in TDMA, one frequency is subjected to time division to obtain time slots, and one time slot is used as a radio control channel, thereby facilitating extension.

According to the present invention, as has been described above, there is provided a radio channel arrangement in mobile communications, wherein even if a traffic taper is present, a frequency resource can be effectively utilized, efficient control signal transmission requiring a smaller number of transmitters/receivers can be performed, and a system can be easily modified into an optimal arrangement in a system extension or the like.

What is claimed is:

1. A method of arranging radio control channels in mobile communications, for covering a service area with a plurality of radio zones and causing base and mobile stations to exchange signals through the control channels, comprising the steps of:
   assigning a broadcasting information transmission portion to the control channels;
   broadcasting from the base station of a given radio zone specific broadcasting channel information contained in the broadcasting information transmission portion, said specific broadcasting channel information being associated with a given radio zone containing the base station; and
   using the specific broadcasting channel formation received by a given mobile station and a mobile station identification number commonly recognizable by said base station and said given mobile station to determine a frequency and a time slot capable of enabling the base station and said given mobile station to exchange the signals.

2. A method according to claim 1, wherein the specific types of broadcasting channel information associated with the control channel structure in said broadcasting information transmission portion are identical in all base stations.

3. A method according to claim 1, wherein the specific types of broadcasting channel information associated with the control channel structure in said broadcasting information transmission portion are different in all base stations.

4. A method according to claim 1, wherein the signals exchanged by the base station and said given mobile station include a paging signal specifically associated to said given mobile station.

5. A method according to claim 4 further including the step of enabling said given mobile station to additionally monitor portions of radio channels corresponding to other radio zones and received by said given mobile station non-contemporaneous with said paging signal.

* * * * *